United States Patent [19]
Marks

[11] 3,756,704
[45] Sept. 4, 1973

[54] PLIABLE MOUNTING ASSEMBLY FOR SPECTACLE

[76] Inventor: Mortimer Marks, 166-25 Cryders Ln., Whitestone, N.Y. 11357

[22] Filed: Mar. 30, 1971

[21] Appl. No.: 129,386

[52] U.S. Cl.................. 351/60, 351/103, 351/104, 351/106, 29/20
[51] Int. Cl............................................. G02c 7/02
[58] Field of Search....................... 351/60, 61, 106, 351/103, 104, 105, 107, 108, 109, 140, 151; 350/132

[56] References Cited
UNITED STATES PATENTS
| | | | |
|---|---|---|---|
| 443,160 | 12/1879 | Briggs................................... | 351/60 |
| 2,323,518 | 7/1943 | Cochran.............................. | 350/132 |

*Primary Examiner*—David Schonberg
*Assistant Examiner*—Paul A. Sacher
*Attorney*—Albert F. Kronman

[57] ABSTRACT

The invention provides a viewing device, eye "glasses" or spectacles of such inexpensive construction that it lends itself to expendable use, as when fitted with orthogonally related polarized plastic lens elements, to enable 3-dimensional movie viewing. The lens elements are held in aligned and spaced relation by a compliant yet permanently deformable channel, which, in one form, is locally bent to define integral temples or ear pieces, which extend rearwardly of the general plane of orientation of the lens elements. A second and shorter length of what may be the same channel material is used as a bridge element, embracing corresponding other edges of the lens elements and also permanently and locally bent for comfortable support by the nose. The channel sidewalls are locally crimped at the bent localities to secure permanent assembly to the lens elements, and the channel section may be so devised that the indicated crimping is the inherent result of permanent bending.

21 Claims, 9 Drawing Figures

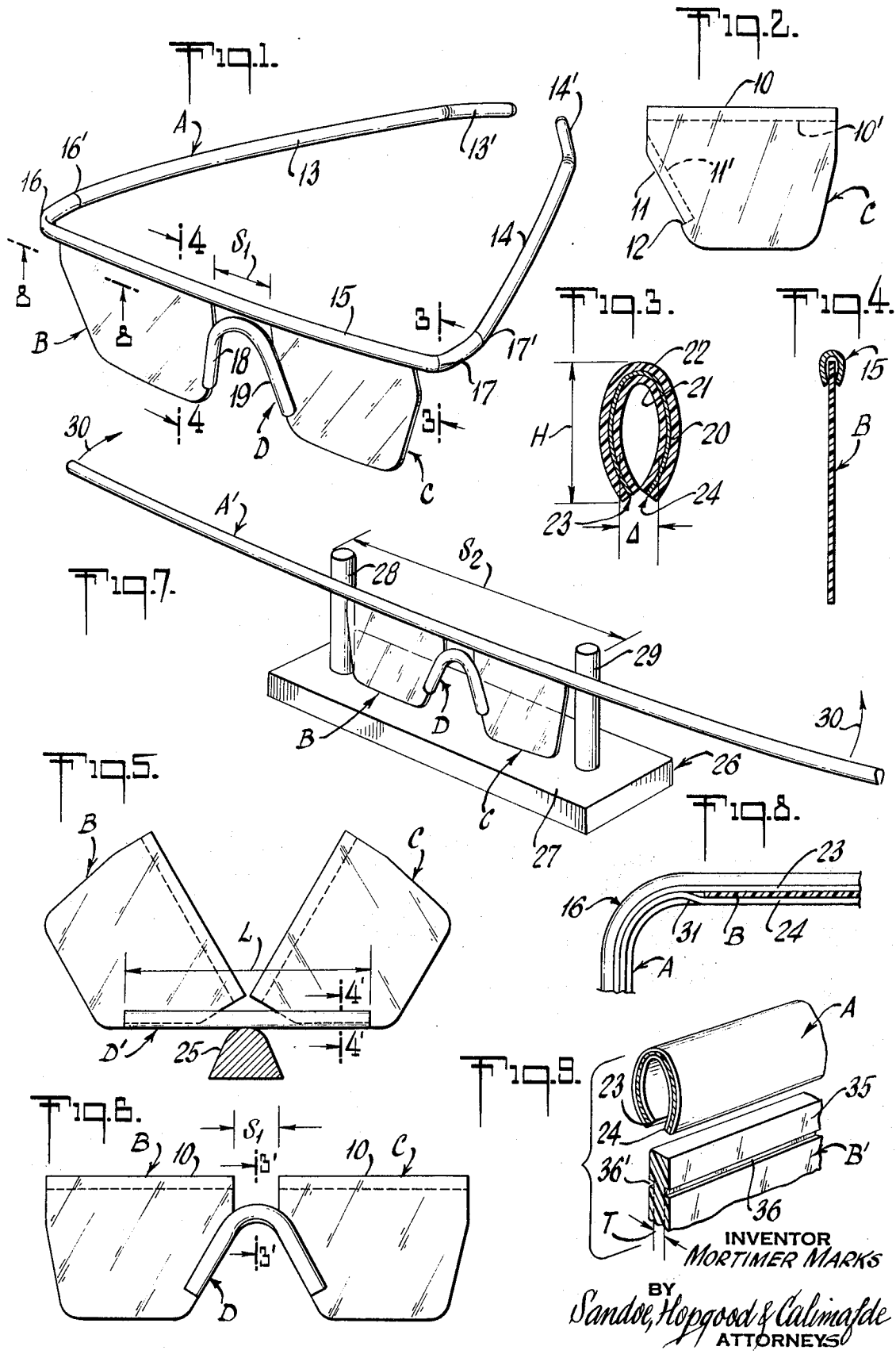

PLIABLE MOUNTING ASSEMBLY FOR SPECTACLE

The invention relates to a viewer, eye "glasses" or spectacles, as for use in protection of the eyes or for differential filtering action at the eyes as to achieve image-coordination for three-dimensional viewing of certain movie projections.

It is an object to provide an improved construction and method of the character indicated.

Another object is to provide an inherently inexpensive and simplified construction and method, without sacrifice of viewing angle or wearing comfort.

Specifically, it is an object to achieve the above objects with a structure in which the user's comfort is optimally accommodated in a single construction, for a wide range of head sizes and interocular spacings; and with light but positive temple pressure, negligible load at nose engagement, wide-angle viewing, and minimum internal reflection.

Other objects and various further features of novelty and invention will be pointed out or will occur to those skilled in the art from a reading of the following specification, in conjunction with the accompanying drawings. In said drawings, which show, for illustrative purposes only, preferred forms of the invention:

FIG. 1 is a view in perspective showing a viewer or spectacles of the invention;

FIG. 2 is a view in elevation of a lens element of the viewer of FIG. 1;

FIGS. 3 and 4 are enlarged sectional views, at alignments 3—3 and 4—4 in FIG. 1, the scale of FIG. 3 being much greater than that of FIG. 4;

FIGS. 5 and 6 are simplified views in elevation to illustrate a manufacturing step;

FIG. 7 is a perspective view to illustrate another manufacturing step;

FIG. 8 is a sectional view taken at the aspect 8—8 in FIG. 1; and

FIG. 9 is a fragmentary exploded view in perspective to illustrate components of a modification.

Briefly stated, the invention contemplates an eye-"glass" construction in which lens elements are held in aligned and spaced relation by a compliant yet permanently deformable channel, which, in one form, is locally bent to define integral temples or ear pieces, which extend rearwardly of the general plane of orientation of the lens elements. A second and shorter length of what may be the same channel material is used as a bridge element, embracing corresponding other edges of the lens elements and also permanently and locally bent for comfortable support by the nose. The channel sidewalls are locally crimped at the bent localities to secure permanent assembly to the lens elements, and the channel section may be so devised that the indicated crimping is the inherent result of permanent bending.

In FIG. 1, the invention is shown in application to a viewer or spectacles construction of four parts, namely, a combined tie bar and temples A, two lens elements B - C, and a bridge element D. The lens elements B - C may be of the same or similar materials, as for example cuttings from transparent sheet which has optical-filtering properties, as may be provided by a light-polarizing coating or lamination. For anti-glare use, the cuttings (which may be die-cuttings) for elements B - C are on the same polarized orientation; for three-dimensional movie viewing, the cuttings are such that polarization at B is substantially orthogonally related to that at C.

The planiforms of the lens elements B - C are symmetrical, about a central vertical axis of symmetry. And the detailed layout in FIG. 2 for the case of lens element C is typical. Essentially, each lens element is of substantially uniform thickness, at least along a top edge 10 and along a bridge-engaging edge 11, which is shown at an acute angle to edge 10, such that when lens elements B - C are in their ultimately assembled positions, their respective bridge-engaging edges 11 are opposed, adjacent and slope with nose-matching divergence in the downward direction. Preferably, each edge 11 is part of a notch or recess in the perimeter of the lens element, the notch terminating at an abutment 12.

The combined bar element A and the bridge element D may be first and second cut lengths of the same relatively stiff channel material that is selected for limited compliant deformability transverse to the elongation direction of the channel, said material being permanently deformably yieldable for bending deflections (e.g., crimping) beyond the region of limited compliant deformation. Thus, the combined bar element A is cut to length to accommodate both the temples or ear-pieces 13–14 and the central lens-spanning portion 15, and the portion 15 is permanently crimped, at least in part, at regions in which the spaced lens elements B - C are received in the groove of the channel; the depth of such groove reception is indicated by dashed line 10' in FIG. 2. The primary bends 16–17, from which temples 13–14 are referenced to the central portion 15, are preferably adjacent the outer limits of channel-groove engagement with the lens-element means B - C.

In like manner, the channel groove at each of the ends 18–19 of an arched or bent second length of channel material embrace the bridge-engaging edges 11 of lens elements B - C. Preferably, the thickness of channel material matches the offset of notch abutment 12, for pleasing appearance as well as positive location in assembly. Again, a permanent crimping deformation of the channel, at least to a part of each of the lens elements B - C, assures secure assembly, and the dashed line 11' in FIG. 2 illustrates depth of groove reception, at the bridge arm 19.

In the presently preferred form in which I have been manufacturing according to the invention, the channel material comprises a metal-channel core 20, to which inner and outer coatings 21–22 of suitable plastic, such as cellulose acetate butyrate, have been applied as shown in FIG. 3. The basic channel shape, in unstressed condition, is characterized by side walls which converge at their ends 23–24 to an extent less than the maximum internal span $\Delta$ between the side walls, and any spacing at ends 23–24 (in the unstressed condition) is at least no greater than the edge thickness of a lens element. Specifically, in conjunction with a lens-material thickness of 0.030 inch, I have had highly satisfactory results employing aluminum of 0.005-inch thickness at core 20. To this, a 0.020-inch thickness of plastic has been applied by extrusion directly onto core 20, at both inner and outer coatings 21–22. This has involved a channel side-wall and bottom thickness of 0.045 inch, while the overall finished-channel height has been 0.175 inch, and the maximum internal span $\Delta$ has been in the order of 0.055 to 0.065 inch.

In manufacture, the second length of channel material, used to form bridge element D, is precut to a length L which is at least more than the ultimate span $S_1$ between lens elements B – C. The straight channel, thus cut, is identified D' in FIG. 5. The convergent ends 23–24 of the channel sidewalls are compliantly spread (i.e., without permanent deformation) to permit edgewise insertion of an edge 11 (of one of the lens elements B – C) to each longitudinal end of the length D', insertion being complete upon end abutment at 11; FIG. 4 illustrates the nature of the engagement upon such insertion, illustrative of the section 4' — 4' in FIG. 5. The thus-assembled three parts B – C – D' have the appearance shown in FIG. 5, where it will be appreciated that the channel groove faces upwardly. Permanent deformation is then induced to form the central arch or bend in the channel, between lens elements. As shown, a suitably contoured fixed tool element 25 forms a reference for such bending, to the shape depicted in FIG. 6, wherein the top edges 10 of elements B – C are in general alignment. In the course of such bending, the convergent ends 23–24, being spaced less than the span Δ, will have been drawn into even more tight convergence, with permanent crimping or pinching action on at least adjacent local parts of lens elements B – C; the pinched and contacting side-wall ends 23–24 of FIG. 3 are illustrative of the section at 3' — 3' in FIG. 6, after making the arched bend of channel D. Since the deformation is permanent, the shape and relation of FIG. 6 are retained.

Next, the longer cut length of channel material is spread to permit edge-wise insertion and sliding, along edges 10, for assembly of elements B – C to the groove of the channel. The thus-cut channel is shown at A' in FIG. 7, wherein the subassembly of FIG. 6 has been assembled symmetrically with respect to the center of length A'.

FIG. 7 also schematically indicates a tool or jig 26 for next bending the length A' to the shape and configuration of element A in FIG. 1. Jig 26 is shown to comprise a base 27 with two suitably rounded and fixed parallel posts 28–29 rising therefrom. To accomplish the bends 16–17, the lens elements B – C are vertically oriented and centrally positioned between posts 28–29, as shown, and then the projecting free ends of channel length A' are bent in the direction of the arrows 30, preferably until substantially a right-angle bend has been achieved at each location; such bending may be manually accomplished while finger-pinching the abutment of the channel A' to posts 28–29 or, alternatively, suitably hinged and actuated forming elements (not shown) may serve an equivalent function and form part of a more complex jig structure 26, as will be understood.

Having thus formed the bends 16–17, I prefer to produce additional permanent bends 16' – 17' at equal, but only slightly rearwardly, offset locations. The same jig 26 may serve this purpose by selecting a plate (not shown), of length to permit tangent abutment with both posts 28–29 and of length at least no greater than the maximum spacing $S_2$, between over-all limits of posts 28–29; such plate should have thickness in accordance with the desired offset location of bends 16' – 17' so that, when the plate is interposed between the lens elements B – C and posts 28–29 (with the channel ends outside posts 28–29), finger pressure may achieve the desired further bends 16' – 17' using the posts 28–29 for bending reference. Thus bent, the arms, ear pieces or temples 13–14 are integral and converge, in the direction away from the lens elements. If desired, posts 28–29 may be used as references for even further bending as at 13' – 14', for better engagement with the head of the viewer.

It will be appreciated that in the course of effecting the permanent bends 16–17, the channel side-wall ends 23–24 are brought into a permanent, further-convergent relation, in which adjacent local parts of both lens elements B – C are tightly compressed, for secure retention of the assembly. This relation is shown in FIG. 8, for the case of the bend 16, wherein side-wall ends 23–24 develop the permanent crimp action at 31 on lens element B.

FIG. 9 shows a modification wherein the side-wall ends 23–24 of channel A are sized and poised to embrace a thickened edge portion 35 of a lens element B'. The effective thickening at 35 is in relation to the thickness T of adjacent lens material; in the form shown, two like grooves 36–36' on opposite sides of the lens material, and offset from and parallel to the straight edge 35 (as to the extent for line 10' with respect to edge 10 in FIG. 2), provide this result, for lens material which may otherwise be of uniform thickness. Grooves 36–36' may be press-formed into the plastic lens material by forming-roll or other techniques, referenced to edge 35, as will be understood. A securely located hold is thus assured, for the full length of channel overlap with both lens elements B – C, and permanent crimping, adjacent bends 16–17 and adjacent the bend of bridge member D, are as previously described.

It will be seen that I have described structure and a method of assembly which meet all stated objects and which at the same time presents a pleasant appearance. "Glazing" of lens elements is automatic, as a result of channel insertion, and full-view vision is achieved by avoiding rims, which are dark and annoying, especially for theatre viewing. The lens elements are securely clamped by the binding action of the channel, achieved in the course of permanent bending deformation. Hinges have been eliminated but may be used, if desired, as by inserting flexible strips to act as hinges, at or adjacent to the permanently crimped regions of channel A.

In use, it has been found particularly desirable to procure channel material which has been wound on relatively large-diameter drums, e.g., 12 to 24-inch diameter, and with the H-elongation axis (see FIG. 3) of the channel section parallel to the drum axis, i.e., with the channel opening facing in one axial direction of the drum axis. In this case, the channel material removed from the drum is gently arched, as shown for the cut length A' in FIG. 7. This arched character desirably remains, after bending at 16–17 to produce convergent arcs for temples 13–14, and to produce an outwardly facing convex bow in the lens-retaining span 15. The bow at 15 will impart similar bow to the lens elements B – C, resulting in minimized reflection via the concave lens surfaces adjacent the eyes.

While the invention has been described in detail for the preferred forms shown, it will be understood that modifications may be made without departure from the invention. For example, the nose bridge D and/or the channel A may be bent to final position before assembly to the lens elements B – C, relying upon side-wall spreading and compliant action of the channel sidewalls, to permit lens assembly and retention, with or without further permanently deforming crimping action.

Also, wearing comfort may be enhanced by eliminating end sharpness which may result from cutting the channel material, e.g., the length A' wherein sharp ends might characterize the ends 13' – 14' of the temples. This can be done by a suitable forming operation or by dipping the cut end into a heated fusible material, such as a thermoplastic, sealing wax, or the like. On cooling, the latter technique automatically forms a bead or rounded knob, as suggested at the rounded ends of ear temples in FIG. 1, effectively eliminating any sharp edge.

What is claimed is:

1. A spectacles construction, comprising an elongated channel of relatively stiff material selected for limited compliant deformability transverse to the elongation direction of said channel, said material being permanently deformably yieldable for bending deflections beyond the region of limited compliant deformability, optical-viewing lens means having an elongated-edge portion received in a central part of the length of said channel and overlapped on both sides by the respective sidewalls of the channel, whereby non-overlapped portions of said channel extend longitudinally beyond both ends of the region of overlap of said edge portion, said channel being permanently bent in both non-overlapped portions adjacent the ends of said region of overlap and in the same general direction away from the general plane of orientation of said lens means, whereby the channel side walls in the bent non-overlapped portions are drawn together in permanently deformed enhanced retention of both ends of said edge of said lens means.

2. A construction according to claim 1, in which the non-overlapped portions project substantially equal distances beyond the bent portions and converge toward their ends, thus defining ear pieces which are spread against compliant resilient loading when worn for viewing.

3. A construction according to claim 1, in which said lens means comprises sheet material having said edge.

4. A construction according to claim 3, in which said sheet material is a transparent light-filtering plastic.

5. A construction according to claim 4, in which said sheet material is characterized along said edge with a section thickness greater than that by which it is connected to the remainder of said lens means, said greater thickness being substantially wholly received in said channel, whereby the crimping of side walls inherent in the permanent bending deformation causes the side walls to envelop the greater-thickness region at least near said bends.

6. A construction according to claim 5, in which said greater-thickness edge is defined by an elongated surface groove parallel to said edge and formed in otherwise uniform-thickness lens material, the ends of the channel side walls substantially registering with the said groove.

7. A construction according to claim 5, in which the channel is one of two registering channels each formed on an opposite side of said sheet material.

8. A construction according to claim 1, in which said channel is of generally rounded U-shape, the outer ends of the side walls of the channel being converged toward each other to an extent exceeding the maximum separation of said sidewalls, whereby the inserted edge of said lens means is engaged in compliantly preloaded compression by said side walls along the region of overlap.

9. A construction according to claim 8, in which said channel comprises a U-shaped metal core, and a continuous coating of plastic material on both the inside and the outside of said core.

10. A construction according to claim 1, in which said lens means comprises two lens elements of plastic sheet material, each element having an edge received in said channel with the lens elements spaced to provide normal binocular viewing through the respective elements.

11. A construction according to claim 10, in which said channel is gently arched along the part which receives said channel, said arch being concave in the general direction in which said non-overlapped ends are bent.

12. A construction according to claim 10, in which said lens elements have different optical-filtering characteristics.

13. A construction according to claim 12, in which said lens elements are of light-polarizing character.

14. A construction according to claim 13, in which the polarizing axes of said lens elements are substantially orthogonally related.

15. A construction according to claim 13, in which the polarizing axes of said lens elements are of substantially the same orientation.

16. A construction according to claim 10, in which adjacent opposed edges of said lens elements extend in divergent alignments in the direction away from said channel, and a bridge element of said channel material permanently bent into an inverted generally V-shape with the channel side walls facing outwardly, said sidewalls overlapping the diverging edges of said lens elements at the respective arms of the V of said bridge element, said bridge element side walls being in compressionally stressed crimping engagement with at least a portion of each lens element.

17. A construction according to claim 16, in which said divergent adjacent opposed edges are each defined by a local recess which terminates short of the lower limit of the lens element, thereby defining a stop, the opposed ends of said bridge element being located at the respective stops of said lens elements.

18. A spectacles construction, comprising a first elongated channel of permanently deformable material, two lens elements of sheet plastic material each having an edge received in a different one of two successive lengths of said channel and in the central region of said channel, said channel being locally crimped to permanently converge the side walls against said lens elements adjacent at least the outer limits of the total span of channel overlap with said lens elements, whereby ear-piece members may be formed from the permanently deformed regions of said channel, and a bridge element comprising second channel of said material and having spaced ends with side walls embracing corresponding other edges of said lens elements and locally crimped to permanently engage the side walls thereof against said lens elements adjacent at least that part of said bridge element which extends between said lens elements.

19. A construction according to claim 18, in which said ear-piece members are integral ends of said first channel and said locally crimped deformation thereof is at rearwardly directed permanently deformed earpiece-defining bends.

20. The construction of claim 19, in which said channel material is of plastic-coated metal cut from elongated length to produce said first and second channels, and a coating of fusible material over the cut ends of said first channel.

21. A mounted optical element, comprising an elongated channel of relatively stiff material selected for limited compliant deformability transverse to the elongation of the channel, said material being permanently deformably yieldable for bending deflections beyond the region of limited compliant deformability, optical-viewing lens means having an elongated-edge portion received in a part of the length of said channel and overlapped on both sides by the respective side walls of the channel, whereby a non-overlapped portion of said channel extends longitudinally beyond the region of overlap of said edge portion, said non-overlapped portion being permanently bent in the region of adjacency to the overlapped portion and about an axis transverse to the elongation of the channel, whereby the channel side walls in the bent non-overlapped portion are drawn together in permanent deformation for enhanced retention of said lens means.

\* \* \* \* \*